Sept. 21, 1954  A. LATERNSER  2,689,684
INTEGRATING MECHANISM
Filed March 28, 1951  3 Sheets-Sheet 1

INVENTOR
ALBIN LATERNSER
BY
ATTORNEYS

Sept. 21, 1954     A. LATERNSER     2,689,684

INTEGRATING MECHANISM

Filed March 28, 1951     3 Sheets-Sheet 2

INVENTOR:
ALBIN LATERNSER
BY
Morgan, Finnegan & Durham
ATTORNEYS.

Sept. 21, 1954  A. LATERNSER  2,689,684
INTEGRATING MECHANISM
Filed March 28, 1951  3 Sheets-Sheet 3

INVENTOR
ALBIN LATERNSER
BY
Morgan, Finnegan & Durham
ATTORNEYS

Patented Sept. 21, 1954

2,689,684

UNITED STATES PATENT OFFICE 2,689,684

INTEGRATING MECHANISM

Albin Laternser, Horgan, Switzerland, assignor to Landis & Gyr, A. G., Zug, Switzerland, a body corporate of Switzerland Application March 28, 1951, Serial No. 217,970

1 Claim. (Cl. 235—61)

The present invention relates to novel and improved integrating thermal meters for measuring the quantity of heat supplied over a period of time.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

The acompanying drawings, referred to herein and constituting a part hereof, illustrate one embodiment of the invention, and together with the description, serve to explain the principles of the invention.

This application is a continuation in part of my copending application Ser. No. 665,359 filed April 27, 1946.

Figure 1:
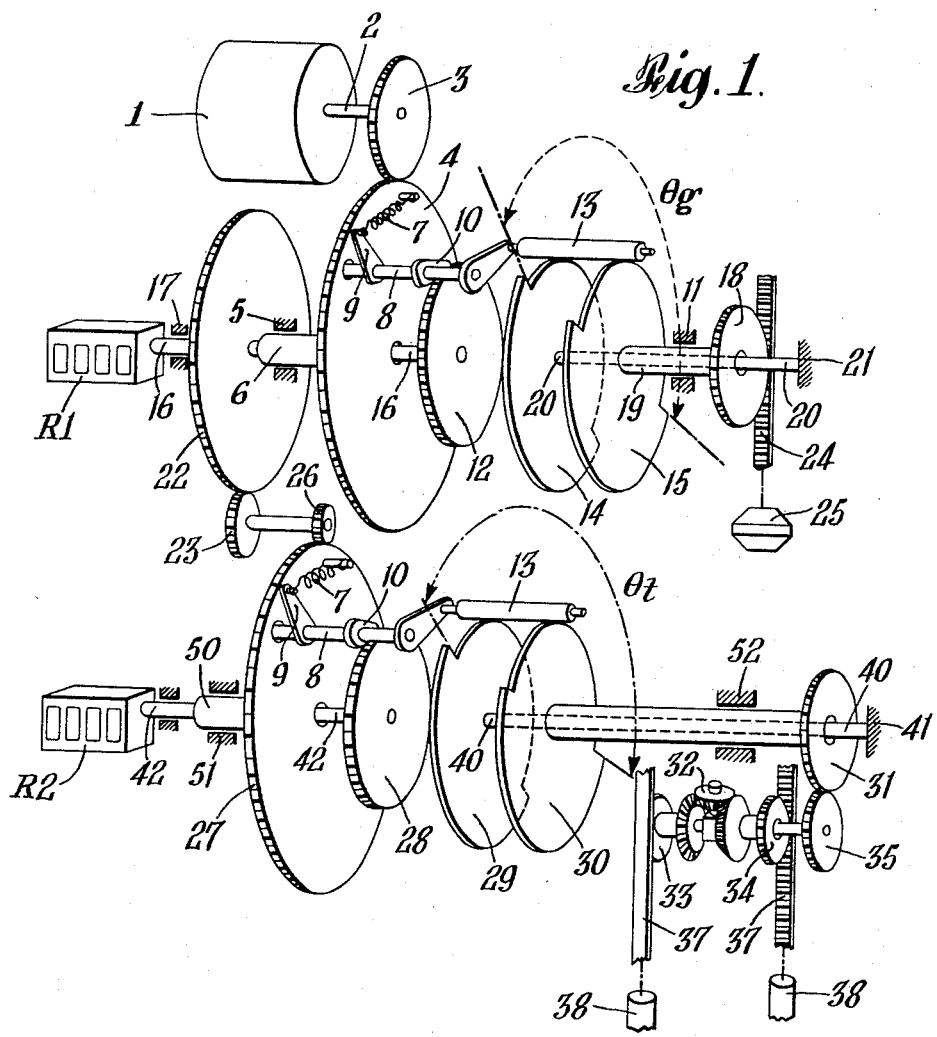
Fig. 1 is a diagrammatic functional showing of the device of the invention in order to illustrate clearly the operation thereof.
Figure 2:
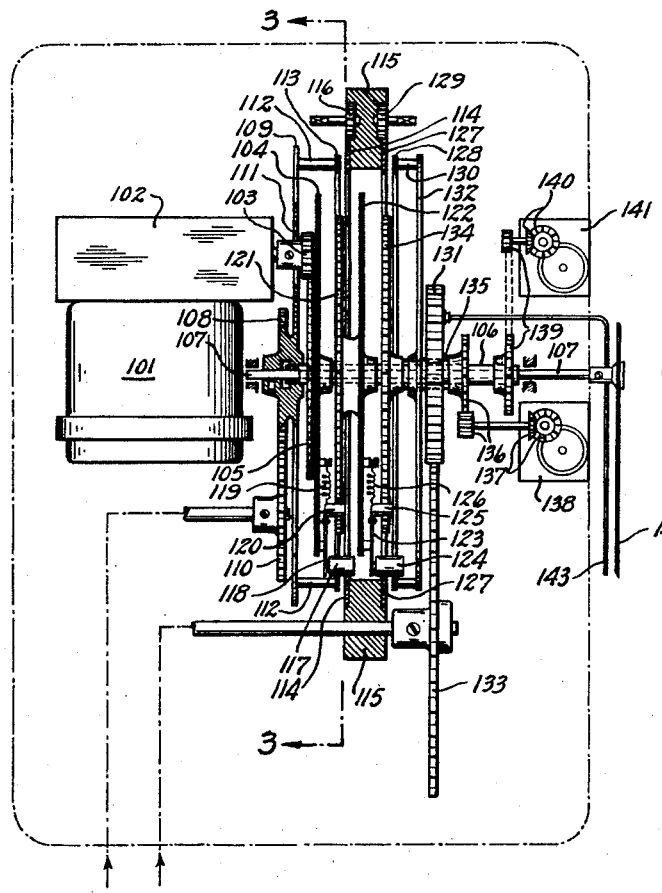
Fig. 2 is a view partly in vertical cross section and partly in elevation of a preferred and illustrative embodiment of the invention.

The invention relates to mechanical means for measuring the quantity of heat supplied based on the quantity of flow and the heat lost in the system being heated. The quantity of heat is proportional, apart from certain limitations as regard the constancy of specific heat $c$ and specific gravity $\gamma$, to the throughput $Q$ of the heat carrier and the difference of temperature $\Delta t$ between the lines supplying and removing the heat carrier to and from a consumer.

The following equation holds good $$W = c \cdot \gamma \cdot \int_0^T (Q \cdot \Delta t) d\tau$$

where $W$ is the quantity of heat in kcal, $T$ the time, and $\tau$ the time variable. Of the two factors $Q$ and $\Delta t$, the first may be determined by means of a baffle or the corresponding effective pressure in connection with float gauges, or by means of an impeller, or the like. The second, $\Delta t$, may be determined for example by means of a differential gear on which act two liquid thermometers.

Multiplication mechanism of various kinds have been developed for the continuous multiplication of the two factors and the continuous integration of the products formed. However, the previously known devices are erratic in their operation, are extremely bulky, and do not provide reliable and usable results over a wide range of values to be measured.

The device of the invention provides a novel and improved integrating thermal meter of the cascade type which is simple and reliable in operation, which is extremely compact in form, and which produces accurate results over a very broad range of measured values. In accordance with the invention there are provided a plurality of integrating devices, one driven by the other, and both are driven from a source of power which may conveniently be a synchronous or other constant speed motor, each of the integrating devices being controlled by one or more of the quantities measured and so connected that the final shaft of the multiplication mechanism is advanced proportionally to the integrated quantity. A ratchet wheel and pawl are used as integrating gears in each of the integrating devices, the pawl engaging the ratchet wheel periodically only during a space of time proportional to the value to be integrated. Said integrating mechanisms are telescoped so as to provide an extraordinarly compact structure for the device as a whole, and all gearing means are arranged about a common shaft, which serves as the pointer shaft for indicating one of the variables, the amount of throughput, in the embodied device. Each pawl in the ratchet wheel and pawl integrating devices is controlled by means of a pair of gap rings, one of which is positioned in accordance with a variable value and the other of which may be conveniently positioned and set by hand. Indicating means are provided in the multiplication mechanism of the invention for indicating directly the two variables to be multiplied, and counting mechanism is provided to register on the one hand the value of product integrated during the time and on the other hand to register the time of integration of at least one of the two variables.

It will be understood that the foregoing general description and the following detailed description as well are exemplary and explanatory of the invention but are not restrictive thereof.

Referring first to Fig. 1 of the drawings wherein the device is shown diagrammatically and from which the function may be readily understood, there is provided a constant speed motor 1 having a gear 3 mounted on its shaft 2 to drive the gear 4 which is rotatably journalled in bearing 5 by means of the sleeve 6 fixed to the gear 4. Gear 4 carries on its face rock shaft 8 which is rocked in a clockwise direction by spring 7 acting through arm 9 to urge pawl 10 towards an interengagement with teeth on ratchet wheel 12, the ratchet being carried by shaft 16 journalled in sleeve 6 and also in bearing 17 so as to drive the totalizing register R1. Pawl 10 may be disengaged from the ratchet 12 by counterclockwise rocking of the shaft 8 which movement is controlled by means of the roller 13 carried at the end of another arm fast to shaft 8. Roller 13 is lifted or dropped by the tension of spring 7 under control of two cam discs 14 and 15, these discs being of equal size and similar shape, and mounted coaxially but capable of relative angular movement. The discs 14 and 15 are each provided with a cutaway portion of reduced diameter extending for 180° and by their relative rotation the overlap of the cutaway portions may vary from zero to 180°, thus providing for a wide range of control of the engagement and disengagement of the pawl 10. Cam disc 15 is fixed to sleeve 19 and gear 18 and is journalled in bearing 11. Cam disc 14 is fixed to shaft 20 which is anchored in frame 21 and is thereby held against rotation.

Cam disc 15 is rotated so as to move proportionally to differences in pressure, and for this purpose a differential pressure float 25 is provided to raise and lower rack 24 meshing with gear 18. Thus cam disc 15 is rotated in one direction or the other upon changes in pressure of the steam supply for heating and to be measured thereby controlling the magnitude of the angle $\theta_g$ and determining the portion of time that pawl 10 drives ratchet 12 during each revolution. As cam disc 15 is rotated in a counterclockwise direction the angle $\theta_g$ is decreased and thereby the extent of the angle through which roller 13 rides on the reduced portion of the cams is diminished.

The uncorrected quantity of heat supplied is thus shown by the register R1 as the product of the pressure difference and time.

Gear 22 which is fast on shaft 16 drives gear 27 through the pinions 23 and 26, gear 27 being rotatably mounted by sleeve 50 in bearing 51. Gear 27 is provided on its face with a similar rock shaft 8, arm 9, spring 7, pawl 10 and roller 13 so that it may drive gear 28 fast to shaft 42 and journalled in sleeve 50 to actuate the register R2 to show the compensated or corrected heat quantity.

The pawl 10 is controlled by cam discs 29 and 30, similar to discs 14 and 15 acting through roller 13. The relative angular position of cam discs 29 and 30 is controlled by the temperature difference between the steam supplied through the supply line and the steam returned through the return line. For this purpose cam disc 29 is held fast against rotation by shaft 40 anchored to frame 41 while cam disc 30 is formed with a sleeve connecting it to gear 31 and journalled in bearing 52. Gear 31 meshes with gear 35 connected to the planet shaft of differential 32, the sun gears of the differential being connected to gears 33 and 34 so they may be actuated in reverse directions by their respective racks 37 which in turn are moved up and down by the heat expansion elements 38. One such expansion element is in the supply line while the other element 38 is in the return line.

The rotation of gear 27 is thus proportional to the uncorrected quantity of heat supplied to the system, while the cams 29 and 30 by their relative displacement vary the time during which the pawl 10 engages ratchet 28, thereby compensating for error which would otherwise be introduced into the registration.

For simplicity the float 25 is not shown in detail but has straight line movement proportional to the square root of the pressure component rotating disc 15 so that its position is proportional to the instantaneous value of the rate of flow and thereby the ratchet wheel 12 is advanced proportionally to the product or uncorrected quantity which is corrected by the thermally actuated elements 38 and results in the registration on register R2 of the total of the corrected quantity of heat corresponding to $$c\gamma \int_0^T Q \Delta t$$

If quantity of flow is 100% and $\Delta t$ equals 100% then the gear wheel 22 is rotated the maximum amount during each revolution of the gear 4 and the ratchet wheel 27 is simultaneously rotated. If the pressure quantity is zero, or $\Delta t$ equals zero or both equal zero, ratchet 12 and gear 22 are not rotated as there is no heat being used, and ratchet 28 and shaft 42 are likewise at rest.

If Q equals 100 and $\Delta t$ equals 50 the value of the heat transmitted per hour is 50 and the shaft 16 has its maximum R. P. M. while the shaft 42 has half its maximum R. P. M. If Q equals 50 and $\Delta t$ equals 50 then shaft 42 is driven at one-quarter its R. P. M.

Referring now to the compact efficient and highly accurate mechanism which is the embodiment of the invention shown in Figs. 2, 3 and 4, 101 is a synchronous motor which drives uniformly by means of any suitable gear reduction mechanism 102 and a gear 103 a gear 105 which is rigidly connected to a disc 104. The gear 105 and the disc 104 are loosely mounted for free rotation on a hollow shaft 106. The latter is mounted for free rotation on a pointer shaft 107, which in its turn is rotatably mounted in a housing or framework which is not shown. On the pointer shaft 107 a gear 108 is secured for rotation therewith, and said gear is likewise rigidly connected to a disc 109 and may be positioned by means of a gear 110 within a scope of rotation comprising about 180° for example. The disc 109 is formed to allow for the position of the gear 103 with an arcuate aperture 111. Rigidly connected to the disc 109 by means of spacing bolts 112 is a first gap ring 113 with which is associated closely adjacent thereto a second gap ring 114, said latter ring being mounted for rotary movement in the recess of a plate 115 which is rigidly connected to the apparatus housing. The gap ring 114 has on its outer circumference a gear rim in which engages a gear 116, by means of which the gap ring 114 is adjustable for rotary positioning and setting within a limited range.

Figure 3:
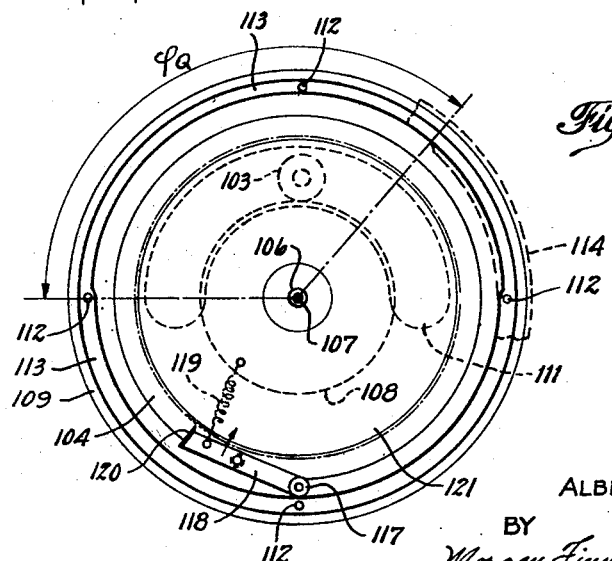
Fig. 3 is a horizontal cross-sectional view taken along line 3—3 of Fig. 2.
Figure 4:
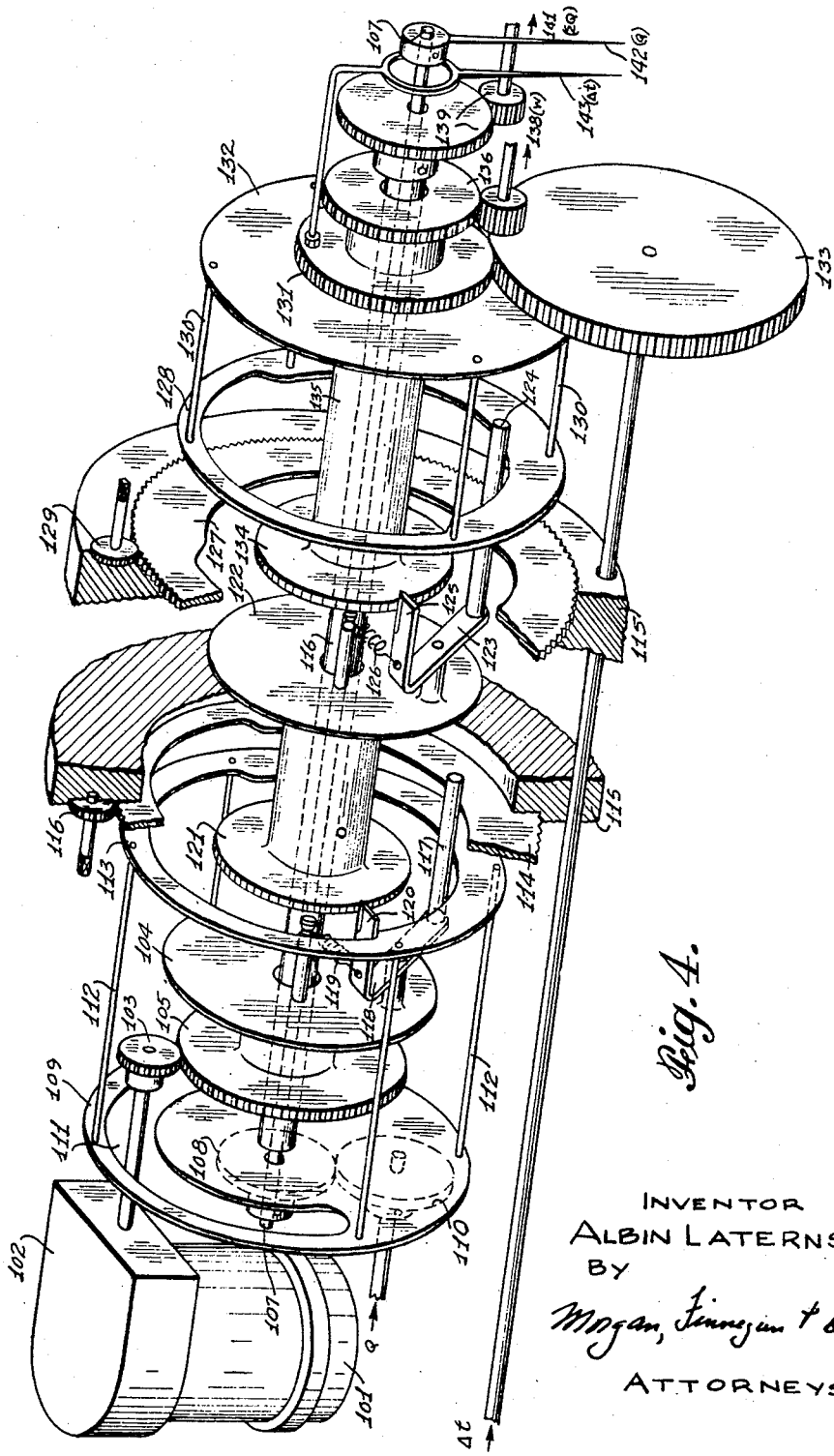
Fig. 4 is an exploded perspective view of the embodiment of the invention shown in Figs. 2 and 3.

Fig. 3 discloses the shape of the gap rings 113, 114 as shown. The radially inner surfaces of said gap rings are not continuous, but exhibit gaps extending for a range of 180°. In Fig. 3 the gaps of the gap rings are at the top of the figure while the normal surfaces are below. As the gap ring 113 has relative rotary motion with respect to the gap ring 114 once the latter has been firmly adjusted, there results on account of the cooperation of the two gap rings 113, 114, a variable gap, which in Fig. 3 is marked $\varphi_Q$. Together with the two gap rings 113, 114 there cooperates a roller 117 which is rotatably mounted on the pawl lever 118, the latter being itself pivotally mounted on the disc 104. Acted on by a coiled spring 119, the roller 117 is always lightly urged against the inner surfaces of the two gap rings 113, 114. As the pawl lever 118 rotates continuously with the disc 104, the inner surfaces of the gap rings 113, 114 are constantly explored. When passing through the gap $\varphi_Q$ the pawl lever 118 is rotated a little in the clockwise direction (Fig. 3), causing the pawl 120 of said lever to engage in the finely spaced tooth arrangement of a ratchet wheel 121 rotating the latter also for an angle corresponding to the momentaneous gap $\varphi_Q$, whereupon the pawl 120 is disengaged again and the gear 121 stops again immediately. Ratchet wheel 121 is nested within gap ring 113 as shown. To the ratchet wheel 121, a disc 122 is rigidly connected, and the two together are rigidly mounted on the hollow shaft 106. The disc 122 carries also a pivotally mounted pawl lever 123 with a roller 124 and a pawl 125. The pawl lever 123 is biased by a spring 126. The roller 124 cooperates with a pair of gap rings 127 and 128, the first of which is mounted for rotary motion in the plate 115 and adjustable by means of a gear 129, the second being rigidly connected by means of spacing bolts 130 to a disc 132 rigidly connected to a gear 131. The gear 131 and with it the disc 132 and the gap ring 128 are rotatably positioned by means of a gear 133. The pawl 125 cooperates with a ratchet wheel 134 which is nested within gap ring 127 and which is loosely mounted on the hollow shaft 106, on the hub 135 of which are likewise rotatably mounted the gear 131 and the disc 132 rigidly connected thereto. The ratchet wheel 134 moves in a manner corresponding to the instantaneous gap $\varphi\Delta t$. However this event takes place only when the disc 122 rotates. The movements of the ratchet wheel 134 are transmitted by a gearing means 136 and 137 to a counting mechanism 138, and the rotation of the hollow shaft 106 by the gearing means 139, 140 to a counting mechanism 141. On the pointer shaft 107 a pointer 142 is arranged, and another pointer 143 is connected to the gear 131, which pointer indicates the movement of said gear. For the sake of simplicity, housings, calibrated scales, etc., have not been represented in the drawings.

When the device described is used as a heat quantity meter, two variable measured values are introduced being the throughput Q introduced through gear 110 and the temperature difference $\Delta t$ between the supply and removal line, introduced through gear 133. The gap ring 113 is rotatably displaced by the measured value Q by means of gears 110 and 108, and the gap ring 128 is similarly displaced in accordance with the measured value $\Delta t$ by means of gears 133 and 131. The gaps $\varphi_Q$ and $\varphi\Delta t$ thereby formed are proportional to the measured values Q and $\Delta t$. The first roller 117 continuously explores the gap $\varphi_Q$ and the pawl 120 turns the ratchet wheel 121 through corresponding partial rotation which is transmitted to the roller 124, which in turn explores gap rings 127 and 128 and results in rotation of ratchet wheel 134. Roller 124 of course only explores said gap rings upon rotation of ratchet wheel 121. There is accordingly formed a continuous product of the factors $\varphi_Q \cdot \varphi\Delta t$ or Q and $\Delta t$, which is registered by the counting means 138 through gearing 136, 137, by taking into consideration a constant factor, so that there is thus counted and indicated the quantity of heat W. In addition, the throughput Q is transmitted by the exploration of gap $\varphi_Q$ as the integral value $\Sigma_Q$ to the ratchet wheel 121 and thence by means of hollow shaft 106 and gearing 139, 140 for registration on counting mechanism 141.

The instant valve of Q is furthermore transmitted by means of gear 108 to shaft 107 and indicated by the pointer 142, while the instant value of $\Delta t$ is indicated by the pointer 143 which follows movements of gear 131.

The invention in its broader aspects is not limited to the specific mechanisms shown and described but departures may be made therefrom within the scope of the accompanying claim without departing from the principles of the invention and without sacrificing its chief advantages.

What I claim is:

An integrating meter for thermal quantities comprising, in combination, two pair of relatively thin annular rings having inner cam surfaces thereon, said rings being so arranged along a common axis as to form two outer and inner rings in close juxtaposition to each other, rotating apparatus arranged on the common axis for rotating one outer ring in accordance with variations in the pressure of the heating medium so as to vary the angular relationship between the inner cam surfaces on the outer ring and its adjacent inner ring, a second rotating apparatus on the common axis for rotating said other outer ring in accordance with variations in a temperature differential in the heating medium so as to vary the angular relationship between the inner cam surfaces on the said other outer ring and its adjacent inner ring, a pair of relatively thin ratchet wheels concentrically located within the annular rings, said ratchet wheels being mounted for separate rotation on a common shaft, a constantly driven cam follower for the inner surfaces of the annular rings responsive to pressure changes, said follower adapted to move one of the ratchet wheels in accordance with the cam surfaces, a second cam follower for the inner cam surfaces of the other pair of annular rings said follower mounted on the ratchet wheel for the first-mentioned cam follower and moved only by movement of said ratchet wheel, indicating means coupled to the second-mentioned ratchet wheel for totalizing the movement of the ratchet wheel, and other indicating means coupled to the first-mentioned ratchet wheel for independently indicating the quantities measured by said ratchet wheel.

References Cited in the file of this patent

UNITED STATES PATENTS

| Number | Name | Date |
|---|---|---|
| 1,394,449 | Sandvoss | Jan. 17, 1933 |
| 1,912,420 | Young | June 6, 1933 |

FOREIGN PATENTS

| Number | Country | Date |
|---|---|---|
| 586,614 | Germany | Oct. 24, 1933 |
| 612,841 | Great Britain | Nov. 18, 1948 |
| 662,464 | Great Britain | Dec. 5, 1951 |